(No Model.)
J. A. LATCHA.
PROCESS OF ELEVATING, CONVEYING, PURIFYING, AND DRYING GRAIN.
No. 318,377. Patented May 19, 1885.
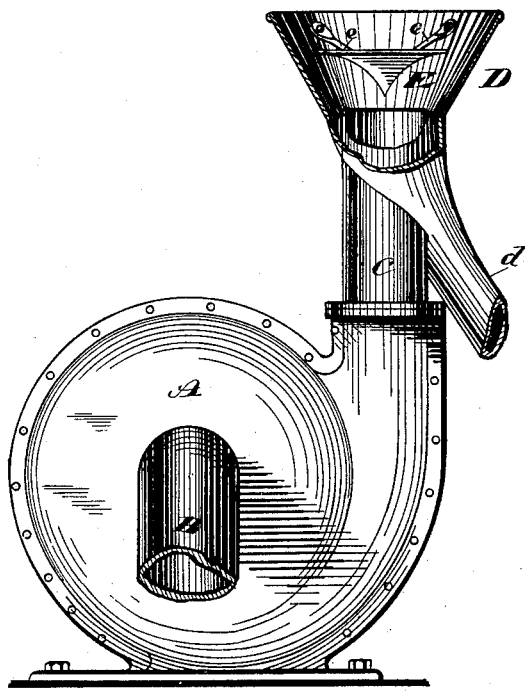

UNITED STATES PATENT OFFICE.

JACOB A. LATCHA, OF CLEVELAND, OHIO.

PROCESS OF ELEVATING, CONVEYING, PURIFYING, AND DRYING GRAIN.

SPECIFICATION forming part of Letters Patent No. 318,377, dated May 19, 1885.

Application filed April 15, 1884. (No model.)

*To all whom it may concern:*

Be it known that I, JACOB A. LATCHA, of Cleveland, in the county of Cuyahoga and State of Ohio, have invented certain new and useful Improvements in a Process for Elevating, Conveying, Purifying, and Drying Grain; and I do hereby declare the following to be a full, clear, and exact description of the invention, such as will enable others skilled in the art to which it pertains to make and use the same.

My invention relates to an improved process for elevating, conveying, purifying, and drying grain, and to mechanism for carrying out the process, the object being to move the grain by air-currents and to provide a deflecting-plate by means of which the grain is separated from the air-current and allowed to descend by gravity through a suitable discharging-outlet, while the air-currents, laden with the moistures and impurities, are discharged into the open air.

With these objects in view my invention consists in certain features of construction and in combination of parts and in the process, hereinafter described, and pointed out in the claims.

In the accompanying drawing, the figure is a side elevation of my improved device, with portions of the outer wall broken away to show the internal construction.

A represents an air-fan provided with the suction-pipe B and a discharge-pipe, C. The pipe B may lead in any direction necessary to receive the grain that is to be moved. The grain, together with large quantities of air, are drawn by suction through the pipe B, and discharged from the fan through the tube C. In the passage through the suction-pipe the air moves with much greater velocity than the grain, and each kernel is swept by the air-current, that removes all moisture and dust and cools the grain. After the discharge from the fan some difficulty was encountered in separating the grain from the air-current. This was attempted by means of a deflecting-screen that allowed the air, laden with the dust, moisture, &c., to pass through the screen, while the grain was deflected by the screen and discharged in another direction through a suitable outlet. The difficulty with this construction was that the screen was soon worn out by the action of the grain that was dashed against it with considerable force.

With my improved construction, a funnel-shaped hood, D, is placed around and extends some distance above the pipe C, the bottom of the hood terminating in a downwardly-projecting discharging-nozzle, *d*. Just above and directly over the mouth of the pipe C is secured a deflecting-plate, E, secured by the braces *e*, or in any suitable manner. This plate is preferably in the shape of an inverted cone, and preferably with a surface more or less concaved, as shown. As the grain strikes the plate it is deflected and thrown against the sides of the hood and falls by gravity to the bottom thereof and is discharged through the nozzle *d*. The air, dust, &c., pass the plate E and are discharged from the hood into the open air. If preferred, a screen may be placed across the hood above the deflecting-plate to arrest the lighter portions of the grain; but if the hood is of sufficient size and height the screen will not be necessary. The enlargement of the hood leaves so much space around the edges of the plate E that the air-current is not strong enough to support the grain after it strikes the sides of the hood, and the grain therefore falls and is discharged, as aforesaid.

The plate E may be made of chilled iron or other hard material, to make it durable, and new plates may at any time be had at a trifling cost.

In transferring grain that is shipped in bulk from one conveyance to another—for instance, from cars to vessels, or vice versa, or from one vessel to another—the laborers that shovel the grain to the elevator, hoisting-buckets, or other apparatus employed, are nearly suffocated by the dust, and are compelled to wear wet sponges over their mouths and nostrils to protect, as far as possible, their lungs from the dust.

With my improved apparatus, and by the use of a flexible suction-pipe, the grain may be elevated without shoveling and without any annoyance from dust, and cooled, renovated, and discharged, as aforesaid.

Even when an elevator is used to convey the grain to a great height my apparatus may be used with great advantage to deliver the grain to the elevator, in place of shoveling the grain, as heretofore practiced.

What I claim is—

1. In a device for conveying, purifying, and drying grain, the combination, with a fan-casing having induction-tube and eduction-tube connected thereto, of a hood surrounding the upper end of the eduction-tube, and provided with a discharging-tube, and a deflecting-plate secured to said hood directly over the end of the eduction-tube, substantially as set forth.

2. In a device for conveying, purifying, and drying grain, the combination, with a fan and fan-casing, and an induction-tube and an eduction-tube connected with said casing, of a hood surrounding the upper end of the eduction-tube and forming a chamber or receptacle into which the grain falls, a grain-discharge pipe connected to the lower portion of the hood, and a deflecting-plate secured to said hood directly over the upper end of the eduction-pipe, substantially as set forth.

In testimony whereof I sign this specification, in the presence of two witnesses, this 11th day of April, 1884.

JACOB A. LATCHA.

Witnesses:
ALBERT E. LYNCH,
CHAS. H. DORER.